(12) United States Patent
Matsumoto et al.

(10) Patent No.: US 10,196,942 B2
(45) Date of Patent: Feb. 5, 2019

(54) MULTI-SHAFT COMBINED CYCLE PLANT, AND CONTROL DEVICE AND OPERATION METHOD THEREOF

(71) Applicants: MITSUBISHI HITACHI POWER SYSTEMS, LTD., Kanagawa (JP); MITSUBISHI HITACHI POWER SYSTEMS EUROPE, LTD., London (GB)

(72) Inventors: Kazunari Matsumoto, Yokohama (JP); Jumpei Suzuki, Yokohama (JP); Elvio Rubio, London (GB); Pablo Ratia, London (GB); Carlos Mora Daniel, London (GB)

(73) Assignees: MITSUBISHI HITACHI POWER SYSTEMS, LTD., Kanagawa (JP); MITSUBISHI HITACHI POWER SYSTEMS EUROPE, LTD., London (GB)

( * ) Notice: Subject to any disclaimer, the term of this patent is extended or adjusted under 35 U.S.C. 154(b) by 149 days.

(21) Appl. No.: 15/128,220

(22) PCT Filed: Mar. 26, 2015

(86) PCT No.: PCT/JP2015/059326
§ 371 (c)(1),
(2) Date: Sep. 22, 2016

(87) PCT Pub. No.: WO2015/147143
PCT Pub. Date: Oct. 1, 2015

(65) Prior Publication Data
US 2017/0058717 A1     Mar. 2, 2017

(30) Foreign Application Priority Data
Mar. 28, 2014   (JP) .................. 2014-070325

(51) Int. Cl.
*F01K 23/10*         (2006.01)
*F01K 13/02*         (2006.01)
(Continued)

(52) U.S. Cl.
CPC ............ *F01K 23/101* (2013.01); *F01D 25/10* (2013.01); *F01K 7/16* (2013.01); *F01K 7/165* (2013.01);
(Continued)

(58) Field of Classification Search
CPC .......... F01K 23/10; F01K 23/101; F01K 7/16; F01K 7/165; F01K 13/02; F02C 6/18;
(Continued)

(56) References Cited

U.S. PATENT DOCUMENTS

| 4,437,313 A * | 3/1984 | Taber .................... F01K 23/101 60/39.182 |
| 2005/0022497 A1* | 2/2005 | Takai .................... F01K 23/101 60/39.182 |
| 2013/0106110 A1* | 5/2013 | Marley, II ................ F02C 6/00 290/52 |

FOREIGN PATENT DOCUMENTS

| DE | 905 137 | 2/1954 |
| EP | 1 503 047 | 2/2005 |

(Continued)

OTHER PUBLICATIONS

Extended European Search Report dated Mar. 7, 2017 in corresponding European Application No. 15768319.4.
(Continued)

*Primary Examiner* — Mark Laurenzi
*Assistant Examiner* — Xiaoting Hu
(74) *Attorney, Agent, or Firm* — Wenderoth, Lind & Ponack, L.L.P.

(57) ABSTRACT

In an operation method of a multi-shaft combined cycle plant, a low-load mode in which an output of the multi-shaft
(Continued)

combined cycle plant is adjusted by adjustment of only an output of a gas turbine and a high-load mode in which the output of the multi-shaft combined cycle plant is adjustable by adjustment of the output of the gas turbine and adjustment of an output of a steam turbine are switched according to a demanded load. In the low-load mode, steam at a standby flow rate at which the steam turbine is capable of maintaining a predetermined initial load is supplied to the steam turbine, and the initial load is applied to the steam turbine.

8 Claims, 10 Drawing Sheets

(51) Int. Cl.
  *F01K 7/16*    (2006.01)
  *F01D 25/10*   (2006.01)
  *F02C 6/18*    (2006.01)
  *F02C 9/28*    (2006.01)
  *F02C 9/42*    (2006.01)
  *F01K 11/02*   (2006.01)

(52) U.S. Cl.
  CPC .............. *F01K 11/02* (2013.01); *F01K 13/02* (2013.01); *F02C 6/18* (2013.01); *F02C 9/28* (2013.01); *F02C 9/42* (2013.01); *F05D 2220/31* (2013.01); *F05D 2220/32* (2013.01); *F05D 2220/72* (2013.01); *F05D 2260/82* (2013.01); *F05D 2260/821* (2013.01); *F05D 2260/85* (2013.01); *F05D 2270/114* (2013.01); *Y02E 20/16* (2013.01)

(58) Field of Classification Search
  CPC ..... Y02E 20/16; F01D 25/10; F05D 2260/85; F05D 2260/82; F05D 2260/821
  See application file for complete search history.

(56) References Cited

FOREIGN PATENT DOCUMENTS

| | | |
|---|---|---|
| JP | 2692973 | 12/1997 |
| JP | 2002-70506 | 3/2002 |
| JP | 2003-254011 | 9/2003 |
| JP | 3559573 | 9/2004 |
| JP | 2004-324513 | 11/2004 |
| JP | 2005-054583 | 3/2005 |
| JP | 3977922 | 9/2007 |
| JP | 2009-150392 | 7/2009 |
| JP | 4346220 | 10/2009 |
| JP | 2010-216478 | 9/2010 |
| WO | 2008/139534 | 11/2008 |

OTHER PUBLICATIONS

Written Opinion dated Jun. 30, 2015 in corresponding International Application No. PCT/JP2015/059326, with English Translation.
International Search Report dated Jun. 30, 2015 in corresponding International Application No. PCT/JP2015/059326, with English Translation.

* cited by examiner

MULTI-SHAFT COMBINED CYCLE PLANT, AND CONTROL DEVICE AND OPERATION METHOD THEREOF

TECHNICAL FIELD

The invention relates to a multi-shaft combined cycle plant that includes a gas turbine, an exhaust heat recovery boiler that generates steam using an exhaust gas from the gas turbine, and a steam turbine that is driven by the steam generated by the exhaust heat recovery boiler, in which a gas turbine rotor and a steam turbine rotor are not mechanically connected to each other, and a control device and an operation method thereof. Priority is claimed on Japanese Patent Application No. 2014-070325, filed Mar. 28, 2014, the content of which is incorporated herein by reference.

BACKGROUND ART

As a plant that includes a steam turbine, there is a combined cycle plant that includes a gas turbine and an exhaust heat recovery boiler that generates steam using an exhaust gas from the gas turbine and sends the steam to a steam turbine.

The combined cycle plants include single-shaft combined cycle plants in which a gas turbine rotor and a steam turbine rotor are mechanically connected to each other, and multi-shaft combined cycle plants in which a gas turbine rotor and a steam turbine rotor are not mechanically connected to each other.

The starting time of the steam turbine changes according to a temperature of the steam turbine at the start of operation of the steam turbine. The operation starting time is described in detail in the following Patent Document 1. In Patent Document 1, for example, in a cold state where a metal temperature of a first-stage blade in a steam turbine is close to room temperature, the operation starting time is about 260 minutes. Further, in a hot state where the metal temperature is close to a temperature in a steady operation state, the operation starting time is about 35 to 70 minutes. Further, in a warm state where the metal temperature is a temperature between the cold state and the hot state, the operation starting time is 100 minutes.

That is, in the steam turbine, as an internal temperature of the steam turbine at the start of the operation becomes lower, the operation starting time becomes longer.

PRIOR ART DOCUMENT

Patent Document

Patent Document 1: Japanese Patent No. 3977922

SUMMARY OF INVENTION

Technical Problem

In the multi-shaft combined cycle plant, since the gas turbine rotor and the steam turbine rotor are not mechanically connected to each other, it is possible to stop the steam turbine while the gas turbine is being driven. Thus, in the multi-shaft combined cycle plant, it is considered that the steam turbine operation starts in any state among the cold state, the warm state, and the hot state.

In such a multi-shaft combined cycle plant, similarly to other power generation plants, in a case where fluctuation of a demanded load from the outside is large, it is preferable to handle the fluctuation of the demanded load in as short a period of time as possible.

The present invention provides a multi-shaft combined cycle plant capable of handling fluctuation of a demanded load in a short period of time, and a control device and an operation method thereof.

Technical Solution

According to a first aspect of the invention, there is provided an operation method of a multi-shaft combined cycle plant including a gas turbine, an exhaust heat recovery boiler that generates steam using an exhaust gas from the gas turbine, and a steam turbine that is driven by the steam generated by the exhaust heat recovery boiler, in which a gas turbine rotor of the gas turbine and a steam turbine rotor of the steam turbine are not mechanically connected to each other, the method including: switching, according to a demanded load, between a low-load mode in which an output of the multi-shaft combined cycle plant is adjusted by adjustment of only an output of the gas turbine and a high-load mode in which the output of the multi-shaft combined cycle plant is adjustable by adjustment of the output of the gas turbine and adjustment of an output of the steam turbine; and supplying steam at a standby flow rate at which the steam turbine is capable of maintaining a predetermined initial load to the steam turbine, and applying the initial load to the steam turbine even in the low-load mode.

In this operation method, even in the low-load mode where the demanded load is handled by adjustment of only the output of the gas turbine, steam corresponding to a standby flow rate is supplied to the steam turbine. Thus, in this operation method, in the low-load mode, even if a high-load demanded load that is not to be handled by adjustment of only the output of the gas turbine is received, at that point, an internal temperature of the steam turbine is already equal to or higher than a predetermined temperature, and an initial load is already applied to the steam turbine. Accordingly, in this operation method, it is possible to shorten the time from the time point when the high-load demanded load is received to the time when the output of the multi-shaft combined cycle plant obtained by combining the output of the gas turbine and the output of the steam turbine becomes the demanded load.

According to a second aspect of the invention, in the operation method of a multi-shaft combined cycle plant according to the first aspect, when the demanded load becomes low in the high-load mode and the high-load mode is switched to the low-load mode, the steam at the standby flow rate may be supplied to the steam turbine.

According to a third aspect of the invention, during a period of time from the switching to the low-load mode according to the second aspect to the switching to the high-load mode again, the steam at the standby flow rate may be supplied to the steam turbine.

According to a fourth aspect of the invention, in a case where a load change time point which is a time point at which the demanded load after the switching to the low-load mode according to the second aspect becomes a demanded load which is a high load that is not to be handled by adjustment of only the output of the gas turbine is recognized in advance, the steam at the standby flow rate may be supplied to the steam turbine from the switching to the low-load mode to a steam supply stop time point which is a time point prior to the load change time point, the supply of the steam to the steam turbine may be stopped from the steam supply stop time point to the load change time point, and the multi-shaft combined cycle plant may transition to the high-load mode from the load change time point; and the steam supply stop time point may be a time point at which an internal temperature of the steam turbine is equal to or higher than the predetermined temperature when the load change time point is reached.

According to a fifth aspect of the invention, in the operation method of a multi-shaft combined cycle plant according to any one of the first to fourth aspects, if a condition for supplying the steam from the exhaust heat recovery boiler to the steam turbine is satisfied after the gas turbine operation starts, the steam at the standby flow rate may be supplied to the steam turbine regardless of the level of the demanded load.

According to a sixth aspect of the invention, in the operation method of a multi-shaft combined cycle plant according to any one of the first to fifth aspects, the multi-shaft combined cycle plant may include a steam condenser that returns steam from the steam turbine to water, a bypass steam valve that adjusts a flow rate of steam flowing to the steam condenser from the exhaust heat recovery boiler without passing through the steam turbine, and a main steam valve that adjusts a flow rate of steam supplied to the steam turbine from the exhaust heat recovery boiler, and when supplying the steam at the standby flow rate to the steam turbine, in a state where the bypass steam valve and the main steam valve are opened, an opening degree of at least one of the bypass steam valve and the main steam valve may be controlled so that the steam at the standby flow rate is supplied to the steam turbine.

According to a seventh aspect of the invention, in the operation method of a multi-shaft combined cycle plant according to any one of the first to fifth aspects, the multi-shaft combined cycle plant may include an exhaust gas damper that adjusts a flow rate of the exhaust gas sent from the gas turbine to the exhaust heat recovery boiler, and when supplying the steam at the standby flow rate to the steam turbine, an opening degree of the exhaust gas damper may be controlled so that the steam at the standby flow rate is supplied to the steam turbine.

According to an eighth aspect of the invention, a multi-shaft combined cycle plant includes: a gas turbine; an exhaust heat recovery boiler that generates steam using an exhaust gas from the gas turbine; a steam turbine that is driven by the steam generated by the exhaust heat recovery boiler, and includes a steam turbine rotor that is not mechanically connected to a gas turbine rotor of the gas turbine; a control device that controls adjustment of an output of the gas turbine and an output of the steam turbine; and a steam supply adjuster that adjusts a flow rate of steam supplied to the steam turbine from the exhaust heat recovery boiler.

The control device switches, according to a demanded load, between a low-load mode in which an output of the multi-shaft combined cycle plant is adjusted by adjustment of only the output of the gas turbine and a high-load mode in which the output of the multi-shaft combined cycle plant is adjustable by adjustment of the output of the gas turbine and the output of the steam turbine, controls the steam supply adjuster so that, even in the low-load mode, steam at a standby flow rate at which the steam turbine is capable of maintaining a predetermined initial load is supplied to the steam turbine, and applies the initial load to the steam turbine.

In this multi-shaft combined cycle plant, even in the low-load mode where the demanded load is handled by adjustment of only the output of the gas turbine, steam corresponding to a standby flow rate is supplied to the steam turbine. Thus, in this multi-shaft combined cycle plant, in the low-load mode, even if a high-load demanded load that is not to be handled by adjustment of only the output of the gas turbine is received, at that point, an internal temperature of the steam turbine is already equal to or higher than a predetermined temperature, and an initial load is already applied to the steam turbine. Accordingly, in this multi-shaft combined cycle plant, it is possible to shorten the time from the time point when the high-load demanded load is received to the time when the output of the multi-shaft combined cycle plant obtained by combining the output of the gas turbine and the output of the steam turbine becomes the demanded load.

In a ninth aspect of the invention, in the multi-shaft combined cycle plant according to the eighth aspect, when the demanded load becomes low in the high-load mode and the high-load mode is switched to the low-load mode, the control device may control the steam supply adjuster so that the steam at the standby flow rate is supplied to the steam turbine.

In a tenth aspect of the invention, during a period of time from the switching to the low-load mode to the switching to the high-load mode again, the control device according to the ninth aspect may control the steam supply adjuster so that the steam at the standby flow rate is supplied to the steam turbine.

In an eleventh aspect of the invention, the control device according to the ninth aspect may recognize in advance a load change time point which is a time point at which the demanded load after the switching to the low-load mode becomes a high-load demanded load that is not to be handled by adjustment of only the output of the gas turbine; the control device may control the steam supply adjuster so that the steam at the standby flow rate is supplied to the steam turbine from the switching to the low-load mode to a steam supply stop time point which is a time point prior to the load change time point, may stop the supply of the steam to the steam turbine by the steam supply adjuster from the steam supply stop time point to the load change time point, and may cause the multi-shaft combined cycle plant to transition to the high-load mode from the load change time point; and the steam supply stop time point may be a time point at which an internal temperature of the steam turbine is equal to or higher than the predetermined temperature when the load change time point is reached.

In a twelfth aspect of the invention, the multi-shaft combined cycle plant according to any one of the eighth to eleventh aspects may further include: a steam condenser that returns steam from the steam turbine to water; a bypass steam valve that adjusts a flow rate of steam supplied to the steam condenser from the exhaust heat recovery boiler without passing through the steam turbine; and a main steam valve that adjusts a flow rate of steam supplied to the steam turbine from the exhaust heat recovery boiler, and the steam supply adjuster may include the bypass steam valve and the main steam valve.

When supplying the steam at the standby flow rate to the steam turbine, in a state where the bypass steam valve and the main steam valve are opened, the control device may control an opening degree of at least one of the bypass steam valve and the main steam valve so that the steam at the standby flow rate is supplied to the steam turbine.

In a thirteenth aspect of the invention, the multi-shaft combined cycle plant according to any one of the eighth to eleventh aspects may further include: an exhaust gas damper that adjusts a flow rate of the exhaust gas supplied from the gas turbine to the exhaust heat recovery boiler, and when supplying the steam at the standby flow rate to the steam turbine, the control device may control an opening degree of the exhaust gas damper so that the steam at the standby flow rate is supplied to the steam turbine.

According to a fourteenth aspect of the invention, there is provided a control device of a multi-shaft combined cycle plant including a gas turbine, an exhaust heat recovery boiler that generates steam using an exhaust gas from the gas turbine, a steam turbine that is driven by the steam generated by the exhaust heat recovery boiler, and a steam supply adjuster that adjusts a flow rate of steam supplied to the steam turbine from the exhaust heat recovery boiler, in which a gas turbine rotor of the gas turbine and a steam turbine rotor of the steam turbine are not mechanically connected to each other. The control device switches, according to a demanded load, between a low-load mode in which an output of the multi-shaft combined cycle plant is adjusted by adjustment of only an output of the gas turbine and a high-load mode in which the output of the multi-shaft combined cycle plant is adjustable by adjustment of the output of the gas turbine and an output of the steam turbine, controls the steam supply adjuster so that, even in the low-load mode, steam at a standby flow rate at which the steam turbine is capable of maintaining a predetermined initial load is supplied to the steam turbine, and applies the initial load to the steam turbine.

Advantageous Effects

According to the above-described operation method of a multi-shaft combined cycle plant, multi-shaft combined cycle plant, and control device of a multi-shaft combined cycle plant, it is possible to handle fluctuation of the demanded load in a short period time.

DESCRIPTION OF EMBODIMENTS

Hereinafter, various embodiments of a multi-shaft combined cycle plant according to the invention will be described with reference to the accompanying drawings.

[First Embodiment]

First, a first embodiment of a multi-shaft combined cycle plant according to the invention will be described with reference to FIGS. 1 to 6.

Figure 1:
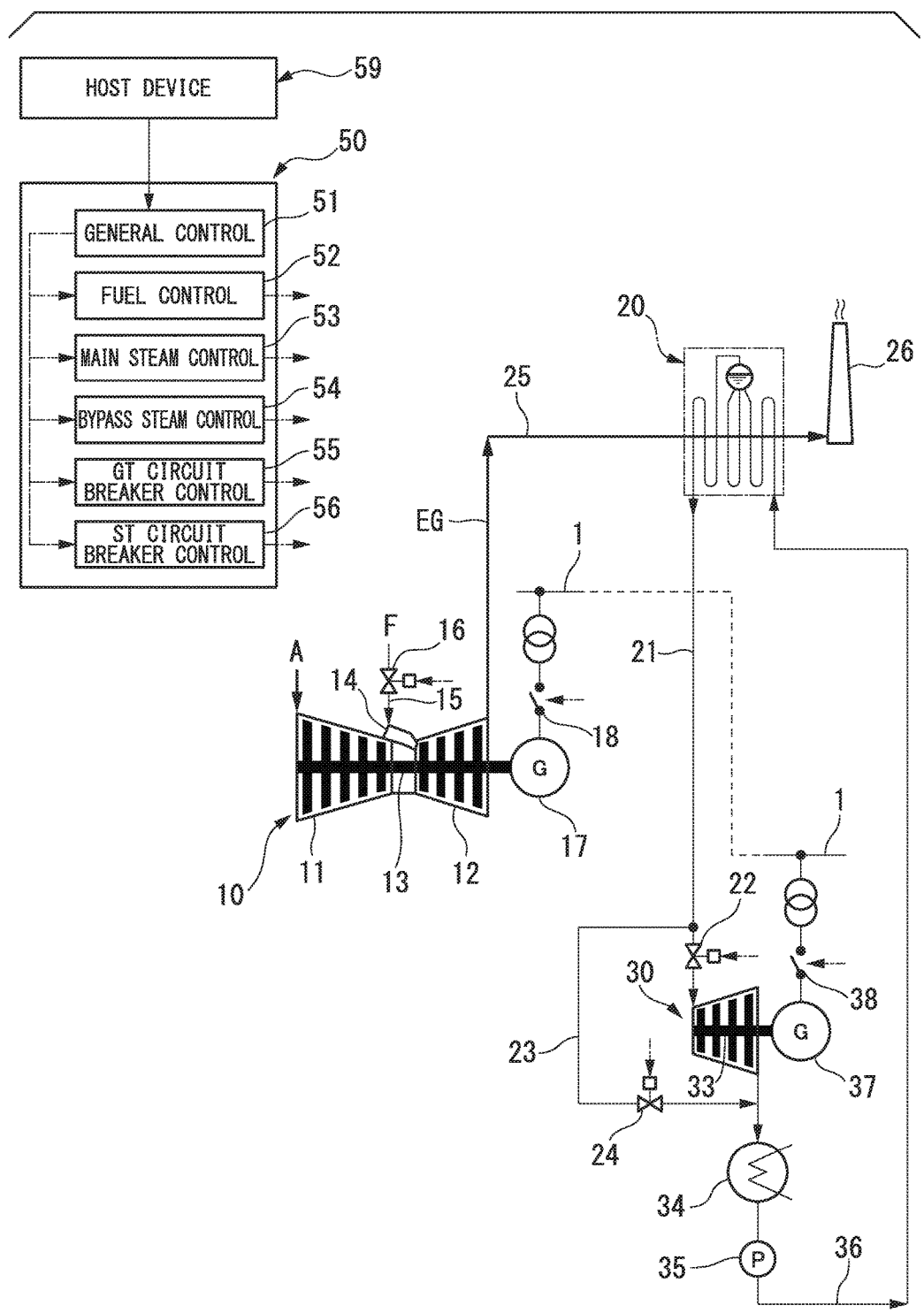
FIG. 1 is a system diagram of a multi-shaft combined cycle plant in a first embodiment according to the invention.

As shown in FIG. 1, the multi-shaft combined cycle plant of the embodiment includes a gas turbine 10, a gas turbine generator 17 that generates electricity by driving of the gas turbine 10, a gas turbine circuit breaker 18 that provides and cuts off electric connection between the gas turbine generator 17 and a power system 1, an exhaust heat recovery boiler 20 that generates steam using heat of an exhaust gas EG exhausted from the gas turbine 10, a steam turbine 30 which is driven by the steam generated by the exhaust heat recovery boiler 20, a steam turbine generator 37 that generates electricity by driving of the steam turbine 30, a steam turbine circuit breaker 38 that provides and cuts off electric connection between the steam turbine generator 37 and the power system 1, a steam condenser 34 that returns steam after driving the steam turbine 30 to water, a water supply pump 35 that returns water in the steam condenser 34 to the exhaust heat recovery boiler 20, and a stack 26 that discharges the exhaust gas EG passed through the exhaust heat recovery boiler 20 into the atmosphere.

The gas turbine 10 includes a compressor 11 that compresses air A, a combustor 14 that combusts fuel F in air compressed by the compressor 11 to generate a combustion gas, and a turbine 12 driven by a high temperature and high pressure combustion gas. A turbine rotor of the turbine 12 and a compressor rotor of the compressor 11 rotate around the same axial line, and are connected to each other to form a gas turbine rotor 13. A rotor of the gas turbine generator 17 is connected to the gas turbine rotor 13.

A fuel line 15 that supplies the fuel F from an external fuel supply source to the combustor 14 is connected to the combustor 14. A fuel adjustment valve 16 that adjusts a flow rate of the fuel F supplied to the combustor 14 is provided on the fuel line 15.

An exhaust port of the turbine 12 and the stack 26 are connected to each other through a gas duct 25. The exhaust heat recovery boiler 20 is provided on the gas duct 25.

The steam turbine rotor 33 is connected to a rotor of the steam turbine generator 37. The steam turbine rotor 33 is not mechanically connected to the gas turbine rotor 13. Thus, rotation of the gas turbine rotor 13 is not in synchronization with rotation of the steam turbine rotor 33, and even when the gas turbine rotor 13 rotates, the steam turbine rotor 33 does not necessarily rotate.

A steam input port of the steam turbine 30 and a steam output port of the exhaust heat recovery boiler 20 are connected to each other through a main steam line 21. A main steam valve 22 that adjusts a flow rate of steam flowing into the steam turbine 30 is provided on the main steam line 21. A steam output port of the steam turbine 30 is connected to a steam input port of the steam condenser 34. A bypass line 23 is branched from the main steam line 21 at an upstream side position with reference to the main steam valve 22. The bypass line 23 is connected to the steam input port of the steam condenser 34. A bypass steam valve 24 that adjusts a flow rate of steam passing through the bypass line 23 is provided on the bypass line 23. A condensate output port of the steam condenser 34 and a water input port of the exhaust heat recovery boiler 20 are connected to each other through a water supply line 36. The water supply pump 35 is provided on the water supply line 36. In this embodiment, the main steam valve 22 and the bypass steam valve 24 form a steam supply adjustor.

The multi-shaft combined cycle plant of this embodiment further includes a control device 50 that controls an operation or the like of the gas turbine 10 and the steam turbine 30 according to a demanded load or the like from a host device 59. The control device 50 includes a fuel control section 52 that controls a flow rate of the fuel F supplied to the gas turbine 10, a main steam control section 53 that controls a flow rate of main steam which is steam flowing into the steam turbine 30, a bypass steam control section 54 that controls a flow rate of bypass steam which is steam flowing in the bypass line 23, a gas turbine circuit breaker control section 55 that controls the gas turbine circuit breaker 18, a steam turbine circuit breaker control section 56 that controls the steam turbine circuit breaker 38, and a general control section 51 that controls these control sections 52 to 56.

The fuel control section 52 gives an instruction for a valve opening degree to the fuel adjustment valve 16, the main steam control section 53 gives an instruction for a valve opening degree to the main steam valve 22, and the bypass steam control section 54 gives an instruction for a valve opening degree to the bypass steam valve 24.

Signals from sensors provided in the gas turbine 10, the steam turbine 30, each line, and the like, and the demanded load from the host device 59 are input to the general control section 51. Operation modes of the multi-shaft combined cycle plant of this embodiment include a low-load mode where an output of the multi-shaft combined cycle plant is adjusted by adjustment of only an output of the gas turbine 10 and a high-load mode where the output of the multi-shaft combined cycle plant is adjustable by adjustment of the output of the gas turbine 10 and adjustment of an output of the steam turbine 30. The general control section 51 determines whether the multi-shaft combined cycle plant is to be operated in the low-load mode or the high-load mode according to the size of the demanded load from the host device 59, and gives an instruction depending on each mode to each of the control sections 52 to 56.

Figure 2:
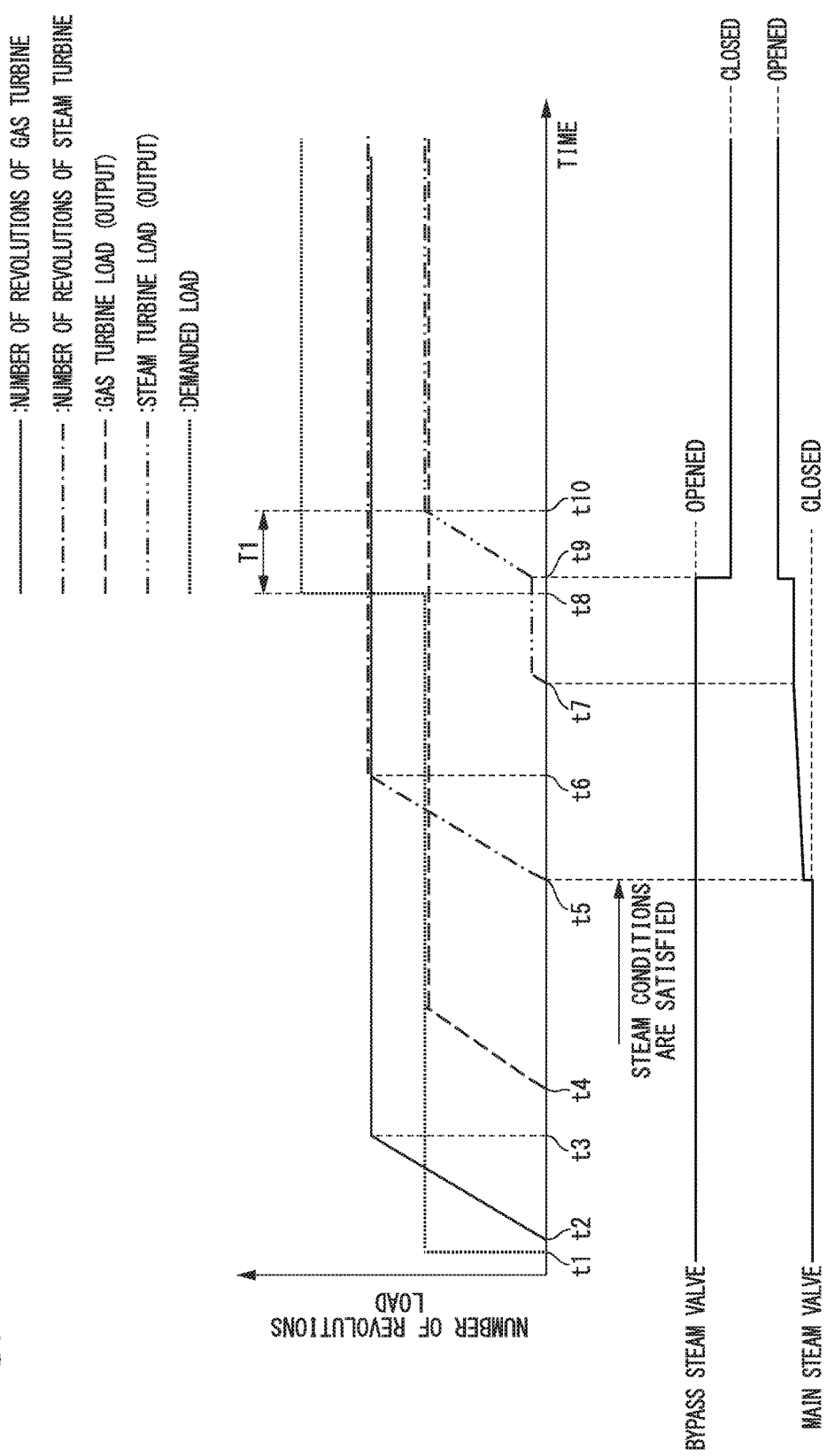
FIG. 2 is a (first) timing chart illustrating an operation of the multi-shaft combined cycle plant in the first embodiment according to the invention.
Figure 5:
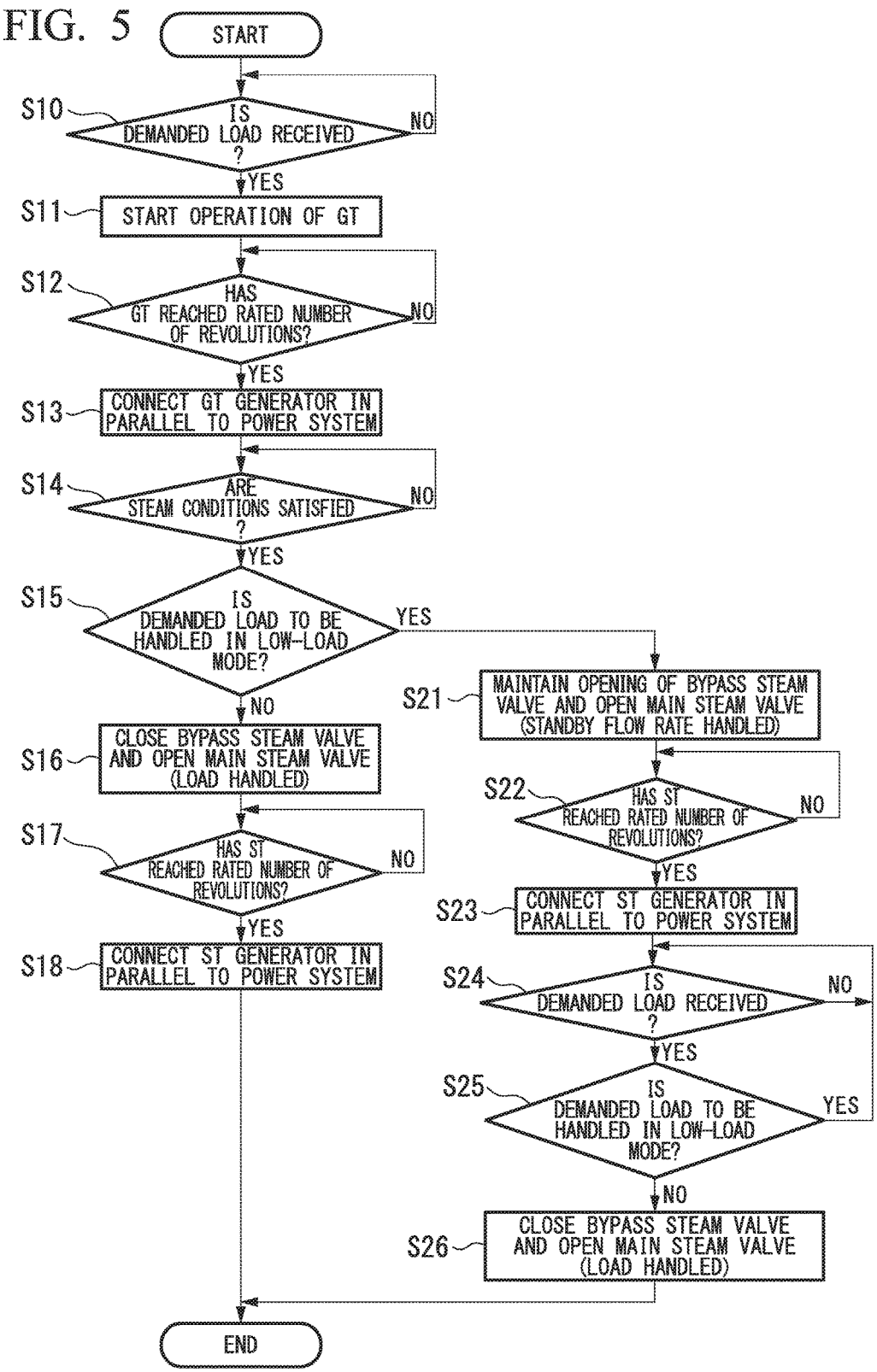
FIG. 5 is a (first) flowchart illustrating an operation order of the multi-shaft combined cycle plant in the first embodiment according to the invention.

Next, an operation of the multi-shaft combined cycle plant of this embodiment will be described according to a timing chart shown in FIG. 2 and a flowchart shown in FIG. 5. Here, an operation from a state where the gas turbine 10 and the steam turbine 30 are both stopped to a state where the gas turbine circuit breaker 18 and the steam turbine circuit breaker 38 are both connected in parallel to the power system 1 so that the multi-shaft combined cycle plant transitions to the high-load mode will be described.

If the demanded load from the host device 59 is received (t1 (FIG. 2) and S10 (FIG. 5)), the control device 50 starts an operation of the gas turbine 10 (t2 (FIG. 2) and S11 (FIG. 5)). Here, the control device 50 gives an instruction to a starter (not shown), and rotates the gas turbine 13 by the starter. As a result, the compressor 11 of the gas turbine 10 compresses the air A in the atmosphere, and supplies the compressed air A to the combustor 14. Further, the fuel control section 52 of the control device 50 gives an instruction for a valve opening degree to the fuel adjustment valve 16, and supplies the fuel F from the fuel line 15 to the combustor 14. In the combustor 14, the fuel F is combusted in the compressed air A, and accordingly, a high temperature and high pressure combustion gas is generated. The combustion gas is sent from the combustor 14 into the turbine 12, to thereby rotate the gas turbine rotor 13. The rotor of the gas turbine generator 17 connected to the gas turbine rotor 13 also rotates by the rotation of the gas turbine rotor 13.

The general control section 51 of the control device 50 instructs the fuel control section 52 to gradually increase the amount of the fuel F supplied to the combustor 14. As a result, the amount of the fuel F supplied to the combustor 14 gradually increases, and the number of revolutions of the gas turbine 13 gradually increases. If the number of revolutions of the gas turbine rotor 13 reaches a predetermined number of revolutions (a number of revolutions of several tens of percent of a rated number of revolutions), the general control section 51 stops a rotation assist of the gas turbine rotor 13 based on the starter. If the number of revolutions of the gas turbine rotor 13 reaches the rated number of revolutions (t3 (FIG. 2) and S12 (FIG. 5)), the general control section 51 gives a parallel-connection instruction to the gas turbine circuit breaker control section 55. If the parallel-connection instruction is received, the gas turbine circuit breaker control section 55 gives a connection instruction to the gas turbine circuit breaker 18. As a result, the gas turbine circuit breaker 18 is closed, and thus, the gas turbine generator 17 and the power system 1 are electrically connected to each other. Thus, the gas turbine generator 17 is connected in parallel to the power system 1 (t4 (FIG. 2) and S13 (FIG. 5)).

The combustion gas after rotating the gas turbine rotor 13 is exhausted from the gas turbine 10 as the exhaust gas EG, and is discharged from the stack 26 to the atmosphere through the exhaust heat recovery boiler 20. The exhaust heat recovery boiler 20 evaporates water using heat of the exhaust gas EG from the gas turbine 10. Steam generated by the exhaust heat recovery boiler 20 is supplied to the steam condenser 34 through the main steam line 21 and the bypass line 23. That is, at this time point, the main steam valve 22 is fully closed and the bypass steam valve 24 is fully opened. The steam supplied to the steam condenser 34 is returned to water therein, and is returned to the exhaust heat recovery boiler 20 through the water supply line 36.

The general control section 51 determines whether or not conditions for supplying the steam generated by the exhaust heat recovery boiler 20 to the steam turbine 30 are satisfied (S14 (FIG. 5)). If it is determined that the conditions are satisfied, that is, steam conditions are satisfied, the general control section 51 determines whether or not to handle the previous demanded load in the low-load mode (S15 (FIG. 5)). That is, the general control section 51 determines whether or not to handle the previous demanded load by adjustment of only the output of the gas turbine 10.

In this embodiment, even in a case where the previous demanded load is to be handled by adjustment of only the output of the gas turbine 10 (YES in S15), if the steam conditions are satisfied, the steam from the exhaust heat recovery boiler 20 is supplied to the steam turbine 30. Specifically, the general control section 51 gives an instruction to the main steam control section 53 and the bypass steam control section 54 so that steam at a standby flow rate at which the steam turbine 30 can maintain an initial load is supplied to the steam turbine 30. The bypass steam control section 54 maintains the bypass steam valve 24 in the fully opened state, and the main steam control section 53 gives an instruction for a valve opening degree to the main steam valve 22 so that the steam at the standby flow rate is supplied to the steam turbine 30 when the bypass steam valve 24 is fully opened (t5 (FIG. 2) and S21 (FIG. 5)). Here, the valve opening degree is not zero. Accordingly, here, the bypass steam valve 24 and the main steam valve 22 are both opened. Further, the main steam control section 53 gives an instruction for a valve opening degree to the main steam valve 22 so that the flow rate of the steam supplied to the steam turbine 30 becomes gradually closer to the standby flow rate.

Here, the initial load refers to a predetermined load which is initially applied to the steam turbine 30 at the time of parallel connection, and for example, is a load of about 5% of a rated load of the steam turbine 30.

That is, in this embodiment, even in a case where the demanded load is handled by adjustment of only the output of the gas turbine 10, the main steam valve 22 is set to a predetermined valve opening degree, and the bypass steam valve 24 is fully opened, so that steam corresponding to the standby flow rate of all the steam from the exhaust heat recovery boiler 20 is supplied to the steam turbine 30. On the other hand, the remaining steam is supplied to the steam condenser 34 through the bypass line 23. As long as the steam corresponding to the standby flow rate of all the steam from the exhaust heat recovery boiler 20 can be supplied to the steam turbine 30, it is not essential that the bypass steam valve 24 is fully opened. For example, the bypass steam valve 24 may be set to a predetermined valve opening degree (not zero) and the main steam valve 22 may be fully opened, or both of the bypass steam valve 24 and the main steam valve 22 may be set to a predetermined valve opening degree (not zero).

If the flow rate of the steam supplied to the steam turbine 30 gradually increases and the number of revolutions of the steam turbine rotor 33 reaches the rated number of revolutions (t6 (FIG. 2) and S22 (FIG. 5)), the general control section 51 gives a parallel-connection instruction to the steam turbine circuit breaker control section 56. If the parallel-connection instruction is received, the steam turbine circuit breaker control section 56 gives a connection instruction to the steam turbine circuit breaker 38.

As a result, the steam turbine circuit breaker 38 is closed, the steam turbine generator 37 and the power system 1 are electrically connected to each other, and the steam turbine generator 37 is connected in parallel to the power system 1 (t7 (FIG. 2) and S23 (FIG. 5)). Further, if the flow rate of the steam supplied to the steam turbine 30 becomes a standby flow rate, the load of the steam turbine 30 becomes the initial load. Thus, the transition from the operation start of the steam turbine 30 to the low-load mode is completed.

If the low-load mode is maintained, a temperature of a first-stage blade of the steam turbine 30 becomes about 500° C. to 530° C., for example. The temperature is equal to or higher than a threshold value (for example, 300° C.) for determining whether or not the steam turbine 30 is in a hot state. Thus, in this embodiment, the steam turbine 30 maintains the hot state even in the low-load mode. In the steam turbine 30 according to this embodiment, when steam corresponding to a rated output is continuously supplied, the temperature of the first-stage blade becomes about 550° C., for example. Further, in this embodiment, even in the low-load mode, the steam turbine generator 37 is connected in parallel to the power system 1, and the steam turbine rotor 33 rotates at the rated number of revolutions.

If a newly demanded load is received from the host device 59 (t8 (FIG. 2) and S24 (FIG. 5)), the general control section 51 determines whether or not to handle the demanded load in the low-load mode (S25 (FIG. 5)). If it is determined that the demanded load is to be handled in the low-load mode (YES in S25), the general control section 51 maintains the low-load mode for supplying steam corresponding to the standby flow rate to the steam turbine 30. Here, the general control section 51 adjusts only an output of the gas turbine 10 to handle fluctuation of the demanded load. The adjustment of the output of the gas turbine 10 involves adjustment of the valve opening degree of the fuel adjustment valve 16, for example.

Further, if it is determined that the newly received demanded load is not to be handled in the low-load mode (NO in S25), the general control section 51 causes the multi-shaft combined cycle plant to transition to the high-load mode. That is, the general control section 51 switches the operation mode of the multi-shaft combined cycle plant from the low-load mode to the high-load mode. Specifically, the general control section 51 fully closes the bypass steam valve 24 using the bypass steam control section 54, and sets the main steam valve 22 to a predetermined valve opening degree using the main steam control section 53 (t9 (FIG. 2) and S26). Here, the main steam control section 53 gives an instruction for a valve opening degree to the main steam valve 22 so that steam at a flow rate necessary for compensating for an increase in the demanded load with the output of the steam turbine 30 is supplied to the steam turbine 30. As a result, the flow rate of the steam supplied to the steam turbine 30 gradually increases, and the output of the steam turbine 30 also gradually increases. Further, if an output of the multi-shaft combined cycle plant obtained by combining the output of the gas turbine 10 and the output of the steam turbine 30 becomes the demanded load (t10 (FIG. 2)), the valve opening degree of the main steam valve 22 becomes approximately constant, and the output of the steam turbine 30 also becomes approximately constant. Thus, the transition from the low-load mode to the high-load mode is completed.

Henceforth, in the high-load mode, whenever a newly demanded load is received, the general control section 51 adjusts one or both of the output of the gas turbine 10 and the output of the steam turbine 30 to adjust the output of the multi-shaft combined cycle plant, thereby handling the demanded load.

Further, in the above-described step 15, if it is determined that the previous demanded load is not to be handled in the low-load mode (NO in S15), the general control section 51 causes the multi-shaft combined cycle plant to transition to the high-load mode without passing through the low-load mode. Even in this case, similarly to the time when the multi-shaft combined cycle plant transitions to the high-load mode as described above, the general control section 51 fully closes the bypass steam valve 24 using the bypass steam control section 54, and sets the main steam valve 22 to a predetermined valve opening degree using the main steam control section 53 (S16 (FIG. 5)). Here, the main steam control section 53 gives an instruction for a valve opening degree to the main steam valve 22 so that steam at a flow rate necessary for compensating for the demanded load with the output of the steam turbine 30 is supplied to the steam turbine 30. Subsequently, if the number of revolutions of the steam turbine rotor 33 becomes the rated number of revolutions (S17 (FIG. 5)), the general control section 51 gives a parallel-connection instruction to the steam turbine circuit breaker control section 56. As a result, the steam turbine generator 37 is connected in parallel to the power system 1 (S18 (FIG. 5)).

Even after the parallel connection of the steam turbine generator 37, the flow rate of the steam supplied to the steam turbine 30 gradually increases, and accordingly, the output of the steam turbine 30 also gradually increases. Further, if the output of the multi-shaft combined cycle plant obtained by combining the output of the gas turbine 10 and the output of the steam turbine 30 becomes the demanded load, as described above, the valve opening degree of the main steam valve 22 becomes approximately constant, and the output of the steam turbine 30 also becomes approximately constant. Thus, the transition from the operation start of the steam turbine 30 to the low-load mode is completed.

Figure 3:
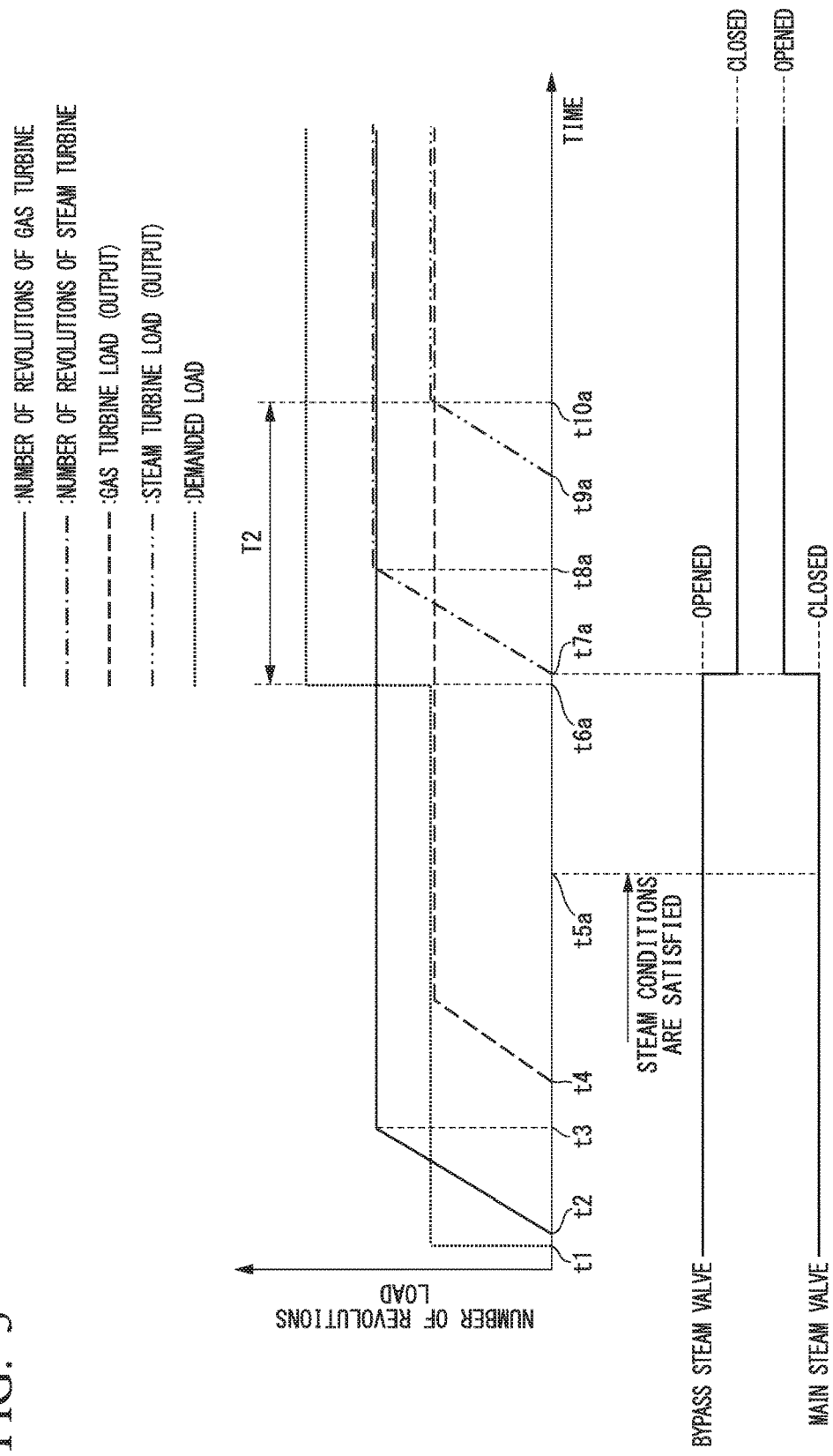
FIG. 3 is a timing chart illustrating an operation of a multi-shaft combined cycle plant in a comparative example.

Here, a comparative example will be described with reference to a time chart shown in FIG. 3.

In this comparative example, in a case where an initially received demanded load (t1) is to be handled by adjustment of only the output of the gas turbine 10, even when conditions for supplying steam generated by the exhaust heat recovery boiler 20 to the steam turbine 30 are satisfied (t5a), the steam is not supplied to the steam turbine 30. That is, in this comparative example, even when the steam conditions are satisfied, the full closing of the main steam valve 22 is maintained, and the full opening of the bypass steam valve 24 is maintained.

Then, in a case where the newly demanded load is received (t6a) and the demanded load is not to be handled by adjustment of only the output of the gas turbine 10, the bypass steam valve 24 is fully closed and the main steam valve 22 is set to a predetermined valve opening degree, so that steam at a flow rate for compensating for an increase in the demanded load with the output of the steam turbine 30 starts being supplied to the steam turbine 30 (t7a). As a result, if the number of revolutions of the steam turbine rotor 33 gradually increases and the number of revolutions becomes a rated number of revolutions (t8a), the steam turbine generator 37 is connected in parallel to the power system 1 (t9a). After the parallel connection of the steam turbine generator 37, the flow rate of the steam supplied to the steam turbine 30 gradually increases, and accordingly, the output of the steam turbine 30 also gradually increases. Further, if the output of the multi-shaft combined cycle plant obtained by combining the output of the gas turbine 10 and the output of the steam turbine 30 becomes the demanded load (t10a), the valve opening degree of the main steam valve 22 becomes approximately constant, and the output of the steam turbine 30 also becomes approximately constant.

In this comparative example, at a time point (t6a) at which the demanded load that is not to be handled by adjustment of only the output of the gas turbine 10 is received, the main steam valve 22 is opened. Thus, in this comparative example, steam starts being supplied to the steam turbine 30 from the time point (t6a) at which the demanded load is received, and accordingly, the temperature of the first-stage blade of the steam turbine 30 gradually increases, and the number of revolutions of the steam turbine rotor 33 gradually increases. Then, if the temperature of the first-stage blade becomes equal to or higher than the above-mentioned threshold value (for example, 300° C.) and the steam turbine rotor 33 reaches the rated number of revolutions (t8a), the steam turbine generator 37 is connected in parallel to the power system 1 (t9a). Accordingly, in this comparative example, a time T2 from the time point (t6a) when the demanded load that is not to be handled by adjustment of only the output of the gas turbine 10 is received to the time (t10a) when the output of the steam turbine 30 increases and the output of the multi-shaft combined cycle plant obtained by combining the output of the gas turbine 10 and the output of the steam turbine 30 becomes the demanded load becomes long.

On the other hand, in this embodiment, at a time point at which the demanded load that is not to be handled by adjustment of only the output of the gas turbine 10 is received (t8 (FIG. 2)), the temperature of the first-stage blade of the steam turbine 30 is already equal to or higher than 500° C., which is equal to or higher than the above-mentioned threshold value (for example, 300° C.). Further, the number of revolutions of the steam turbine rotor 33 has become the rated number of revolutions, and the steam turbine generator 37 is already connected in parallel to the power system 1. Accordingly, in this embodiment, it is possible to significantly shorten a time T1 from the time point when the demanded load that is not to be handled by adjustment of only the output of the gas turbine 10 is received (t8 (FIG. 2)) to the time when the output of the multi-shaft combined cycle plant obtained by combining the output of the gas turbine 10 and the output of the steam turbine 30 becomes the demanded load (t10 (FIG. 2)), compared with the comparative example.

Figure 4:
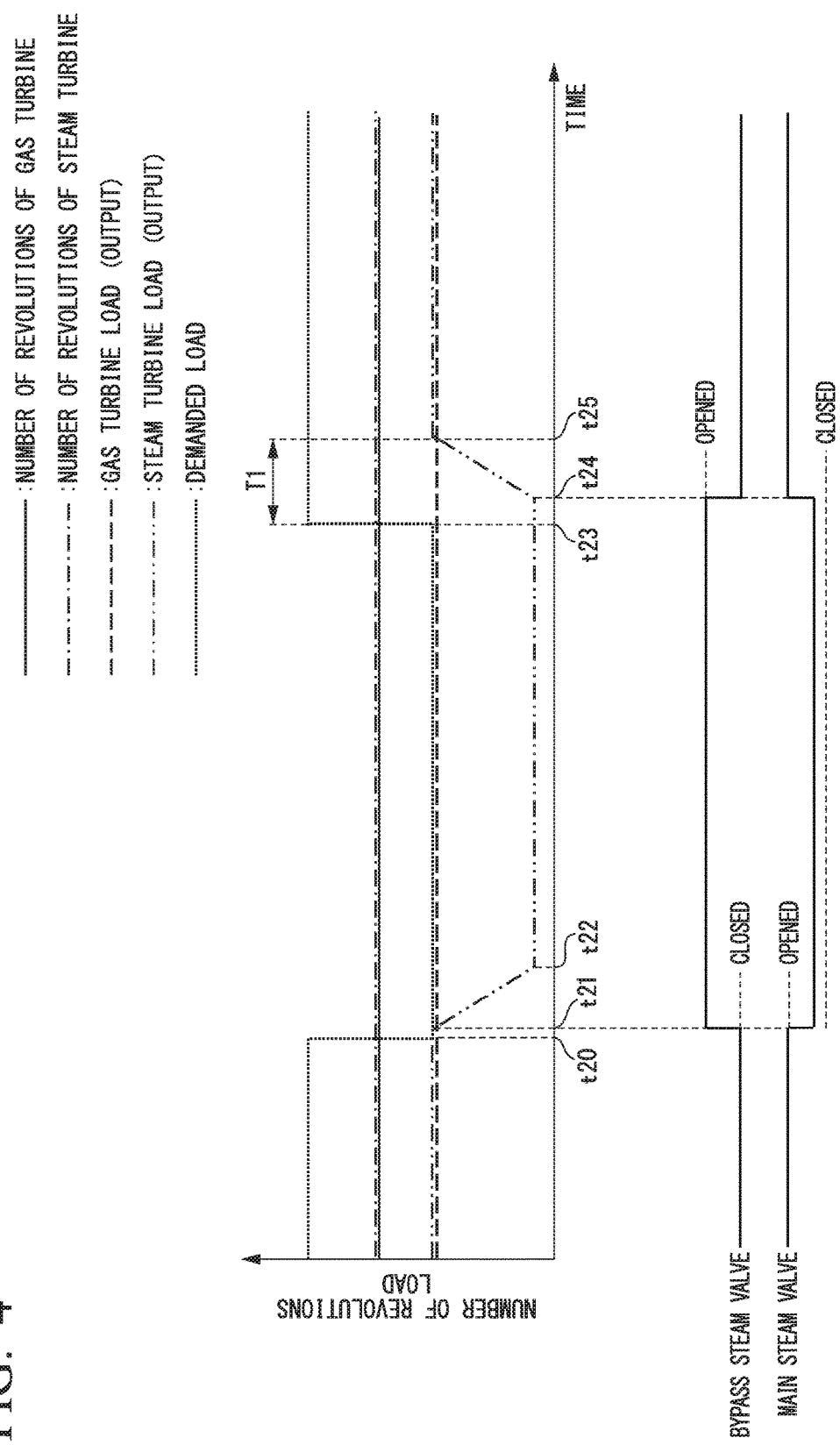
FIG. 4 is a (second) timing chart illustrating the operation of the multi-shaft combined cycle plant in the first embodiment according to the invention.
Figure 6:
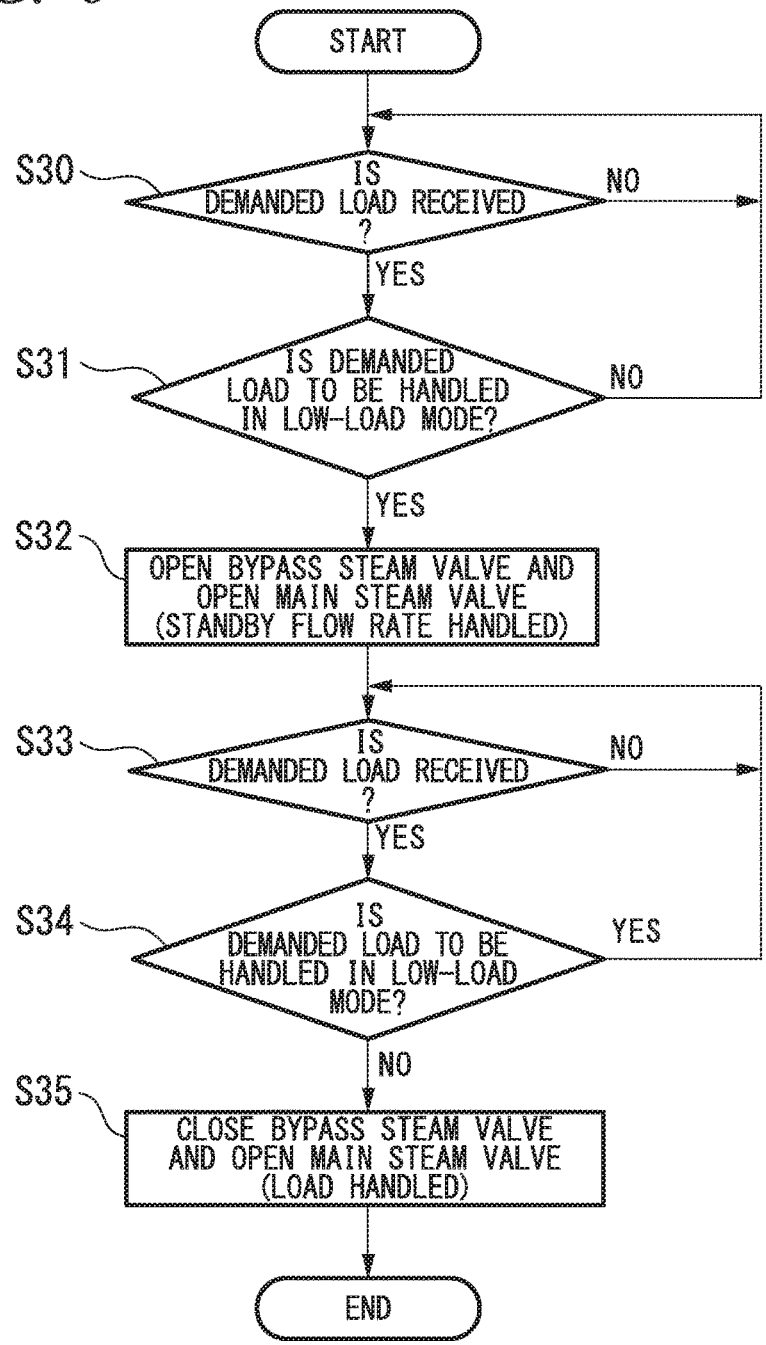
FIG. 6 is a (second) flowchart illustrating the operation order of the multi-shaft combined cycle plant in the first embodiment according to the invention.

Next, an operation of the multi-shaft combined cycle plant after transitioning to the high-load mode of this embodiment will be described with reference to a timing chart shown in FIG. 4 and a flowchart shown in FIG. 6.

In the high-load mode, as described above, the bypass steam valve 24 is fully closed, and the main steam valve 22 is set to a predetermined valve opening degree depending on an output required of the steam turbine 30. If the demanded load is received from the host device 59 (t20 (FIG. 4) and S30 (FIG. 6)), the general control section 51 determines whether or not the demanded load is to be handled in the low-load mode (S31 (FIG. 6)). If it is determined that the demanded load is not to be handled in the low-load mode (NO in S31), the general control section 51 maintains the high-load mode.

Further, if it is determined that the demanded load received in step 30 (t20 (FIG. 4)) is to be handled in the low-load mode (YES in S31), the general control section 51 causes the multi-shaft combined cycle plant to transition to the low-load mode. That is, the general control section 51 switches the operation mode of the multi-shaft combined cycle plant from the high-load mode to the low-load mode. Specifically, the general control section 51 fully opens the bypass steam valve 24 using the bypass steam control section 54, and sets the main steam valve 22 to a predetermined valve opening degree using the main steam control section 53 (t21 (FIG. 4) and S32 (FIG. 6)). Here, the main steam control section 53 gives an instruction for a valve opening degree to the main steam valve 22 so that steam corresponding to a standby flow rate is supplied to the steam turbine 30 when the bypass steam valve 24 is fully opened.

That is, in this embodiment, even in a case where the demanded load is to be handled by adjustment of only the output of the gas turbine 10, the main steam valve 22 is set to the predetermined valve opening degree and the bypass steam valve 24 is fully opened, so that the steam corresponding to the standby flow rate of all the steam from the exhaust heat recovery boiler 20 is supplied to the steam turbine 30. On the other hand, the remaining steam is supplied to the steam condenser 34 through the bypass line 23.

If the flow rate of the steam supplied to the steam turbine 30 gradually decreases and becomes the standby flow rate, the load of the steam turbine 30 becomes the initial load (t22 (FIG. 4)). Thus, the transition from the high-load mode to the low-load mode is completed.

If the demanded load is received from the host device 59 after transition to the low-load mode (t23 (FIG. 4) and S33 (FIG. 6)), the general control section 51 determines whether or not the demanded load is to be handled in the low-load mode (S34 (FIG. 6)). If it is determined that the demanded load is to be handled in the low-load mode (YES in S34), the general control section 51 maintains the low-load mode where steam corresponding to the standby flow rate is supplied to the steam turbine 30. Here, the general control section 51 adjusts only the output of the gas turbine 10 to handle fluctuation of the demanded load.

Further, if it is determined that the demanded load received in step 33 (t23 (FIG. 4)) is not to be handled in the low-load mode (NO in S34), the general control section 51 causes the multi-shaft combined cycle plant to transition to the high-load mode. Specifically, the general control section 51 fully closes the bypass steam valve 24 using the bypass steam control section 54, and sets the main steam valve 22 to a predetermined valve opening degree using the main steam control section 53 (t24 (FIGS. 4) and S35 (FIG. 6)). Here, the main steam control section 53 gives an instruction for a valve opening degree to the main steam valve 22 so that steam at a flow rate necessary for compensating for an increase in the demanded load with the output of the steam turbine 30 is supplied to the steam turbine 30. As a result, the flow rate of the steam supplied to the steam turbine 30 gradually increases, and accordingly, the output of the steam turbine 30 also gradually increases. Further, if the output of the multi-shaft combined cycle plant obtained by combining the output of the gas turbine 10 and the output of the steam turbine 30 becomes the demanded load (t25 (FIG. 4)), the valve opening degree of the main steam valve 22 becomes approximately constant, and the output of the steam turbine 30 also becomes approximately constant. Thus, the transition from the low-load mode to the high-load mode is completed.

As described above, in this embodiment, even in a case where a demanded load is to be handled by adjustment of only an output of the gas turbine 10, steam corresponding to a standby flow rate is supplied to the steam turbine 30, and the steam turbine generator 37 is connected in parallel to the power system 1. Thus, in this embodiment, even if the demanded load that is not to be handled by adjustment of only the output of the gas turbine 10 is received, at that time point (t23 (FIG. 4)), the temperature of the first-stage blade of the steam turbine 30 is already equal to or higher than 500° C., which is equal to or higher than the above-mentioned threshold value (for example, 300° C.). Further, the number of revolutions of the steam turbine rotor 33 has become the rated number of revolutions, and the steam turbine generator 37 is already connected in parallel to the power system 1. Accordingly, in this embodiment, it is possible to shorten the time T1 from the time point when the demanded load that is not to be handled by adjustment of only the output of the gas turbine 10 is received (t23 (FIG. 2)) to the time when the output of the multi-shaft combined cycle plant obtained by combining the output of the gas turbine 10 and the output of the steam turbine 30 becomes the demanded load (t25 (FIG. 4)).

Thus, in this embodiment, while the demanded load is being handled by adjustment of only the output of the gas turbine 10, in a case where a demanded load that is not to be handled by adjustment of only the output of the gas turbine 10 is received, it is possible to shorten the time from the time when the demanded load is received to the time when the output of the multi-shaft combined cycle plant becomes an output corresponding to the demanded load.

[Modified Example of First Embodiment]

Figure 7:
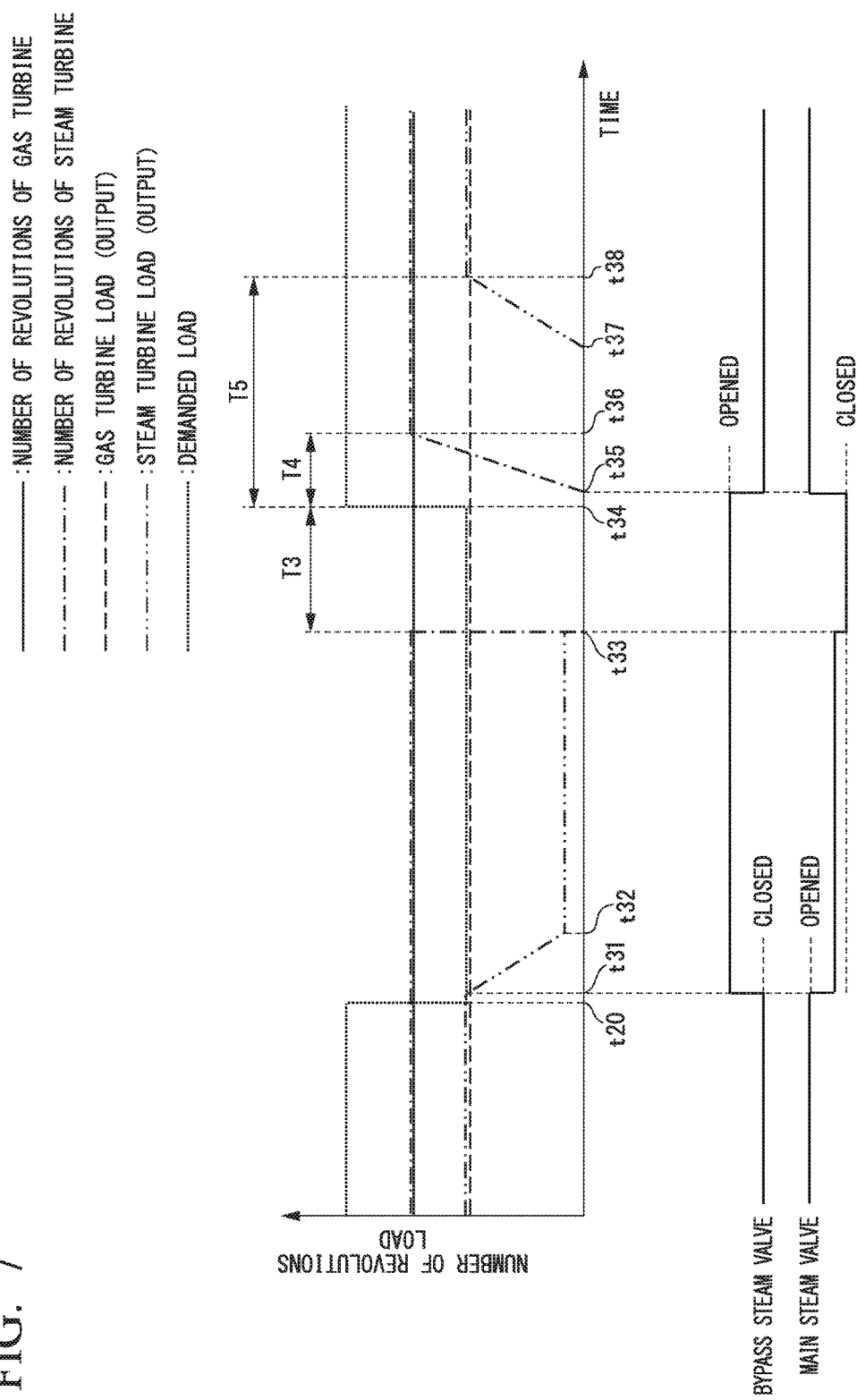
FIG. 7 is a timing chart illustrating an operation of a multi-shaft combined cycle plant in a modified example of the first embodiment according to the invention.
Figure 8:
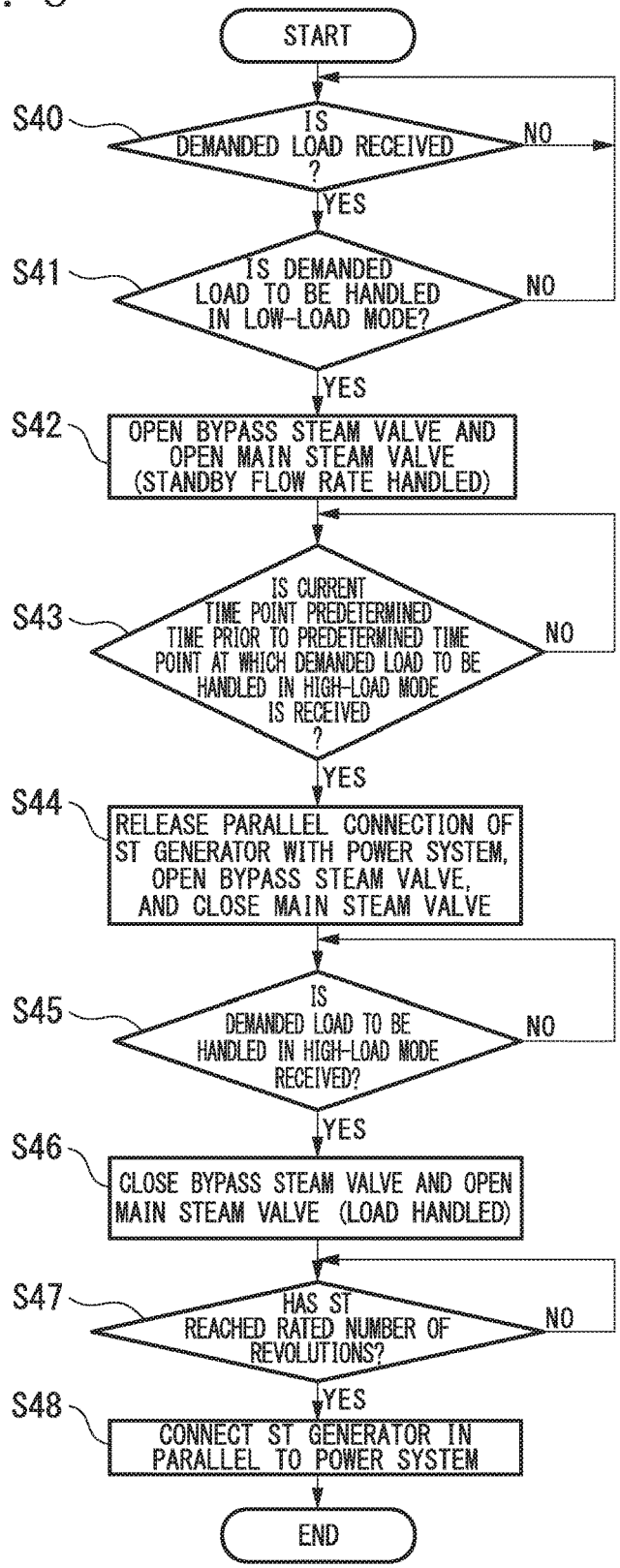
FIG. 8 is a flowchart illustrating an operation order of the multi-shaft combined cycle plant in the modified example of the first embodiment according to the invention.

Next, a modified example of the above-described first embodiment will be described with reference to a timing chart shown in FIG. 7 and a flowchart shown in FIG. 8.

In the above-described first embodiment, during a period of time when a demanded load is being handled by adjustment of only an output of the gas turbine 10, steam corresponding to a standby flow rate is supplied to the steam turbine 30. In this modified example, during a period of time when a demanded load is being handled by adjustment of only the output of the gas turbine 10, steam corresponding to a standby flow rate is supplied to the steam turbine 30, but for a part of the period of time, the steam corresponding to the standby flow rate is not supplied to the steam turbine 30.

In this modified example, an operation from the time when the gas turbine 10 and the steam turbine 30 are both stopped to the time when the gas turbine generator 17 and the steam turbine generator 37 are both connected in parallel to the power system 1, that is, to the time when the multi-shaft combined cycle plant transitions to the high-load mode is similar to that of the first embodiment. Thus, hereinafter, an operation of the multi-shaft combined cycle plant after the multi-shaft combined cycle plant transitions to the high-load mode will be described.

In this modified example, similarly, if a demanded load is received from the host device 59 (t20 (FIG. 7)) and S40 (FIG. 8)), the general control section 51 determines whether or not the demanded load is to be handled in the low-load mode (S41 (FIG. 8)). If it is determined that the demanded load is not to be handled in the low-load mode (NO in S41), the general control section 51 maintains the high-load mode. Further, if it is determined that the demanded load is to be handled in the low-load mode (YES in S41), the general control section 51 causes the multi-shaft combined cycle plant to transition to the low-load mode, similarly to the first embodiment. As a result, the bypass steam valve 24 is fully opened, and the main steam valve 22 is set to a valve opening degree corresponding to steam at a standby flow rate (t31 (FIG. 7) and S42 (FIG. 8)).

If the flow rate of the steam supplied to the steam turbine 30 gradually decreases and becomes the standby flow rate, a load of the steam turbine 30 becomes an initial load (t32 (FIG. 7)). Thus, the transition from the high-load mode to the low-load mode is completed.

Here, in this modified example, a time point at which the demanded load after switching to the low-load mode becomes a demanded load which is a high load that is not to be handled by adjustment of only the output of the gas turbine 10 (load change time point (t34)) is recognized in advance. For example, a case where the demanded load changes as planned corresponds to this case.

In this modified example, after switching to the low-load mode (t32) until a steam supply stop time point (t33) which is prior to the load change time point (t34), the steam at the standby flow rate is supplied to the steam turbine 30, and the supply of the steam to the steam turbine 30 is stopped from the steam supply stop time point (t33) to the load change time point (t34). Further, in this modified example, the multi-shaft combined cycle plant transitions to the high-load mode from the load change time point (t34).

If the steam supply to the steam turbine 30 is stopped at the steam supply stop time point (t33), thereafter the temperature of the first-stage blade of the steam turbine 30 gradually decreases from 500° C., for example. If the multi-shaft combined cycle plant transitions to the high-load mode before the temperature of the first-stage blade of the steam turbine 30 becomes lower than the above-described threshold value (for example, 300° C.), since the steam turbine 30 is in a hot state, it is possible to shorten a time T4 from the time point (t34) when a high-load demanded load is received to the time when the steam turbine 30 reaches the rated number of revolutions. Thus, in this modified example, a time T3 from the time (t33) when the steam supply corresponding to the standby flow rate is stopped to the time when the temperature of the first-stage blade of the steam turbine 30 becomes a predetermined temperature (for example, 300° C.) is recognized in advance, and a time point the time T3 prior to the predetermined load change time point (t34) is set to the steam supply stop time point t33.

In this modified example, if the multi-shaft combined cycle plant transitions to the low-load mode (t32 (FIG. 7)), the general control section 51 determines whether or not a current time point is a time point the predetermined time (T3) prior to the predetermined time point (t34 (FIG. 7)) at which the demanded load that is to be handled in the high-load mode is received. That is, the general control section 51 determines whether or not the steam supply stop time point (t33 (FIG. 7)) which is the predetermined time (T3) prior to the time point (t34) at which the demanded load becomes a high-load demanded load is reached (S43 (FIG. 8)). If it is determined that the steam supply stop time point (t33 (FIG. 7)) is reached (YES in S43), the general control section 51 releases the parallel connection of the steam turbine generator 37 with the power system 1, and stops the supply of the steam to the steam turbine 30, as described above. That is, the general control section 51 gives an instruction for releasing the parallel connection to the steam turbine circuit breaker control section 56, fully opens the bypass steam valve 24 using the bypass steam control section 54, and fully closes the main steam valve 22 using the main steam control section 53 (t33 (FIG. 7) and S44 (FIG. 8)).

Then, if the high-load demanded load is received (t34 (FIG. 7) and S45 (FIG. 8)), the general control section 51 fully closes the bypass steam valve 24 using the bypass steam control section 54, and sets the main steam valve 22 to a predetermined valve opening degree using the main steam control section 53 (t35 (FIG. 7) and S46 (FIG. 8)). Here, the main steam control section 53 gives an instruction for a valve opening degree to the main steam valve 22 so that steam at a flow rate necessary for compensating for an increase in the demanded load with the output of the steam turbine 30 is supplied to the steam turbine 30. Further, if the number of revolutions of the steam turbine rotor 33 reaches the rated number of revolutions (t36 (FIG. 7) and S47 (FIG. 8)), the general control section 51 gives a parallel-connection instruction to the steam turbine circuit breaker control section 56. If the parallel-connection instruction is received, the steam turbine circuit breaker control section 56 gives a connection instruction to the steam turbine circuit breaker 38. As a result, the steam turbine circuit breaker 38 is closed, the steam turbine generator 37 and the power system 1 are electrically connected to each other, and the steam turbine generator 37 is connected in parallel to the power system 1 (t37 (FIG. 7) and S48 (FIG. 8)). Further, after the parallel connection of the steam turbine generator 37, the flow rate of the steam supplied to the steam turbine 30 gradually increases, and accordingly, the output of the steam turbine 30 also gradually increases. If the output of the multi-shaft combined cycle plant obtained by combining the output of the gas turbine 10 and the output of the steam turbine 30 becomes the demanded load (t38), the valve opening degree of the main steam valve 22 becomes approximately constant, and the output of the steam turbine 30 also becomes approximately constant.

As described above, in this modified example, even in a case where a demanded load is to be handled by adjustment of only an output of the gas turbine 10, steam corresponding to a standby flow rate is temporarily supplied to the steam turbine 30. Thus, in this modified example, similarly, even when a demanded load that is not to be handled by adjustment of only the output of the gas turbine 10 is received later, at that time point, the temperature of the first-stage blade of the steam turbine 30 is already equal to or higher than a predetermined temperature, and the steam turbine 30 is in a hot state. Accordingly, in this modified example, as described above, the time T4 from the time point t34 at which the high-load demanded load is received to the time when the steam turbine 30 reaches the rated number of revolutions (t36) becomes short. As a result, it is possible to shorten a time T5 from the time point t34 at which the high-load demanded load is received to the time when the output of the multi-shaft combined cycle plant becomes the demanded load (t38).

[Second Embodiment]

Figure 9:
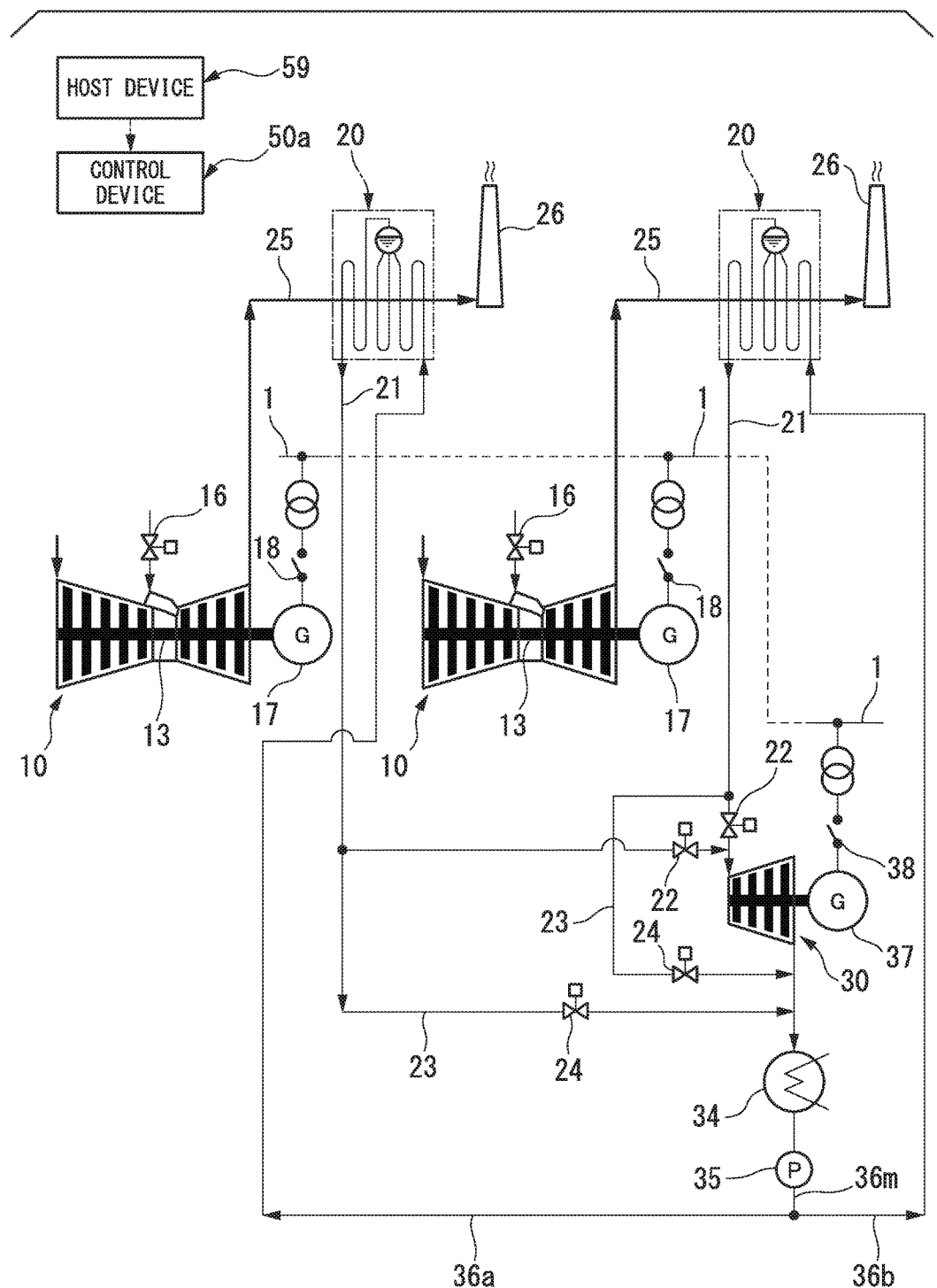
FIG. 9 is a system diagram illustrating a multi-shaft combined cycle plant in a second embodiment according to the invention.

Next, a second embodiment of the multi-shaft combined cycle plant according to the invention will be described with reference to FIG. 9.

The multi-shaft combined cycle plant according to this embodiment is a 2-on-1 type multi-shaft combined cycle plant that includes two gas turbines 10 and 10, and one steam turbine 30.

In this embodiment, a gas turbine generator 17, a gas turbine circuit breaker 18, an exhaust heat recovery boiler 20, and a stack 26 are provided for each of two gas turbines 10 and 10.

Both of steam output ports of the two exhaust heat recovery boilers 20 and 20 are connected to a steam input port of one steam turbine 30 through main steam lines 21. A main steam valve 22 is provided on each main steam line 21. A steam output port of the steam turbine 30 is connected to a steam input port of a steam condenser 34, in a similar way to the first embodiment. A bypass line 23 is branched from an upstream side position with reference to the main steam valve 22 on each main steam line 21. Each bypass line 23 is connected to a steam input port of the steam condenser 34. A bypass steam valve 24 is provided on each bypass line 23. A main water supply line 36m is connected to a condensate output port of the steam condenser 34. A water supply pump 35 is provide on the main water supply line 36m. The main water supply line 36m is branched into two lines at a downstream position with reference to the water supply pump 35, of which one line forms a first water supply line 36a and the other line forms a second water supply line 36b. The first water supply line 36a is connected to a water input port of one exhaust heat recovery boiler 20 of the two exhaust heat recovery boilers 20 and 20, and the second water supply line 36b is connected to a water input port of the other exhaust heat recovery boiler 20.

Similarly to the first embodiment, a steam turbine generator 37 that generates electricity by driving of the steam turbine 30 is connected to the steam turbine 30. A steam turbine circuit breaker 38 that provides and cuts off electric connection with the power system 1 is connected to the steam turbine generator 37. Gas turbine rotors 13 and 13 of the two gas turbines 10 and 10 are not mechanically connected to each other. Further, the gas turbine rotors 13 and 13 of the two gas turbines 10 and 10 and a steam turbine rotor 33 are not mechanically connected to each other.

The multi-shaft combined cycle plant according to this embodiment similarly includes a control device 50a that controls an operation or the like of the gas turbine 10 and the steam turbine 30 according to a demanded load or the like from a host device 59. In the control device 50a, similarly to the control device 50 according to the first embodiment shown in FIG. 1, a fuel control section 52, a main steam control section 53, a bypass steam control section 54, a gas turbine circuit breaker control section 55, a steam turbine circuit breaker control section 56, and a general control section 51 are provided. Here, in the control device 50a of this embodiment, the fuel control section 52, the main steam control section 53, the bypass steam control section 54, and the gas turbine circuit breaker control section 55 are all provided for each gas turbine 10.

The 2-on-1 type multi-shaft combined cycle plant of this embodiment is also basically operated in a similar way to the multi-shaft combined cycle plant according to the first embodiment or the modified example thereof.

Accordingly, in this embodiment, similarly, while a demanded load is being handled by adjustment of only outputs of the two gas turbines 10 and 10, in a case where a demanded load that is not to be handled by adjustment of only the outputs of the two gas turbines 10 and 10 is received, it is possible to shorten the time from the time when the demanded load is received to the time when the output of the multi-shaft combined cycle plant corresponds to the demanded load.

In addition to the 2-on-1 type multi-shaft combined cycle plant including the two gas turbines and one steam turbine, a 3-on-1 type multi-shaft combined cycle plant including three gas turbines and one steam turbine or a 4-on-1 type multi-shaft combined cycle plant may be operated in a similar way to the multi-shaft combined cycle plant according to the first embodiment or the modified example thereof

[Third Embodiment]

Figure 10:
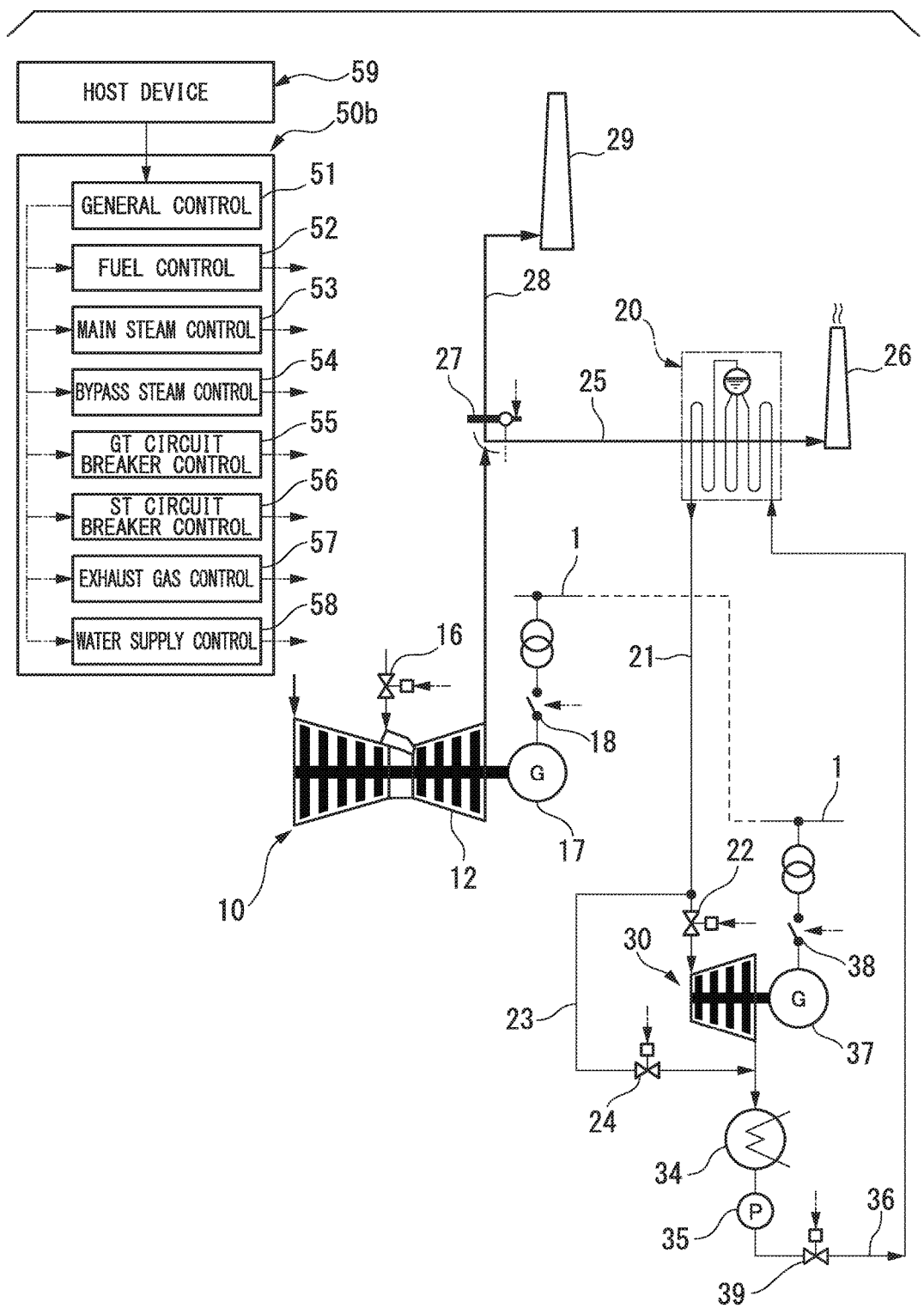
FIG. 10 is a system diagram illustrating a multi-shaft combined cycle plant in a third embodiment according to the invention.

Next, a third embodiment of the multi-shaft combined cycle plant according to the invention will be described with reference to FIG. 10.

The multi-shaft combined cycle plant according to this embodiment includes a gas turbine 10, an exhaust heat recovery boiler 20, and a steam turbine 30, similarly to the first embodiment. In this embodiment, a peripheral configuration of the gas turbine 10 and a gas turbine generator 17, a peripheral configuration of the steam turbine 30 and a steam turbine generator 37, and a peripheral configuration of a steam condenser 34 are similar to those of the first embodiment. Further, in this embodiment, similarly, an exhaust port of a turbine 12 in the gas turbine 10 and a stack 26 are connected to each other through a gas duct 25, and the exhaust heat recovery boiler 20 is provided on the gas duct 25. However, in this embodiment, a sub-gas duct 28 is branched from the gas duct 25 at an upstream side position with reference to the exhaust heat recovery boiler 20. A sub-stack 29 is connected to the sub-gas duct 28. In a portion where the sub-gas duct 28 is branched from the gas duct 25, an exhaust gas damper 27 that adjusts a flow rate of an exhaust gas flowing to the exhaust heat recovery boiler 20 through the gas duct 25 and drains an unnecessary exhaust gas to the sub-gas duct 28 is provided. In addition, in this embodiment, a water supply valve 39 that adjusts a flow rate of water flowing in a water supply line 36 is provided on a downstream side of a water supply pump 35. In this embodiment, the exhaust gas damper 27 and the water supply valve 39 form a steam supply adjuster.

In this embodiment, by adjusting an opening degree of the exhaust gas damper 27 and an opening degree of the water supply valve 39, a standby flow rate of steam supplied to the steam turbine 30 is controlled in the low-load mode. Thus, a control device 50b according to this embodiment includes, in addition to a fuel control section 52, a main steam control section 53, a bypass steam control section 54, a gas turbine circuit breaker control section 55, a steam turbine circuit breaker control section 56, and a general control section 51, an exhaust gas control section 57 that controls the opening degree of the exhaust gas damper 27, and a water supply control section 58 that controls the opening degree of the water supply valve 39.

This embodiment is the same as the first embodiment in an operation from a state where the gas turbine 10 and the steam turbine 30 are both stopped to the time when the gas turbine generator 17 is connected in parallel to the power system 1. Similarly, in this embodiment, until the gas turbine generator 17 is connected in parallel to the power system 1, a main steam valve 22 is fully closed, and a bypass steam valve 24 is fully opened. Further, in this embodiment, the water supply valve 39 is fully opened. In addition, in this embodiment, the exhaust gas damper 27 is fully opened, and the entire exhaust gas from the gas turbine 10 is in a state of flowing to the exhaust heat recovery boiler 20. Thus, if the gas turbine 10 starts operation, the entire exhaust gas from the gas turbine 10 is supplied to the exhaust heat recovery boiler 20, so that steam is generated by the exhaust heat recovery boiler 20. The steam generated by the exhaust heat recovery boiler 20 is sent to a steam condenser 34 through a main steam line 21 and a bypass line 23, and is returned to water therein. The water is returned to the exhaust heat recovery boiler 20 through the water supply line 36.

In this embodiment, if the gas turbine generator 17 is connected in parallel to the power system 1 and steam conditions are satisfied, the main steam valve 22 is fully opened according to an instruction from the main steam control section 53, while the bypass steam valve 24 is fully closed according to an instruction from the bypass steam control section 54. Further, in this embodiment, the opening degree of the exhaust gas damper 27 is adjusted by the exhaust gas control section 57, and the opening degree of the water supply valve 39 is adjusted by the water supply control section 58. By adjustment of the opening degree of the exhaust gas damper 27 and the opening degree of the water supply valve 39, while steam flowing in the main steam line 21 satisfies the above-mentioned steam conditions, a circulation rate of a fluid (steam and water) that circulates through a steam system and a water supply system becomes a standby flow rate.

Accordingly, in this embodiment, similarly to the first embodiment, even in the low-load mode where a demanded load is handled by adjustment of only an output of the gas turbine 10, if the steam conditions are satisfied, steam corresponding to the standby flow rate is supplied to the steam turbine 30.

In this embodiment, in a case where the multi-shaft combined cycle plant transitions to the high-load mode from the low-load mode, the exhaust gas damper 27 and the water supply valve 39 are fully opened. Further, a valve opening degree of the main steam valve 22 is set so that steam at a flow rate necessary for compensating for an increase in the demanded load with the output of the steam turbine 30 is supplied to the steam turbine 30.

INDUSTRIAL APPLICABILITY

According to the operation method of a multi-shaft combined cycle plant, the multi-shaft combined cycle plant, and the control device of a multi-shaft combined cycle plant, it is possible to handle fluctuation of a demanded load in a short period of time.

REFERENCE SIGNS LIST 1 power system
10 gas turbine 11 compressor
12 turbine
13 gas turbine rotor
14 combustor
15 fuel line
16 fuel adjustment valve
17 gas turbine generator
18 gas turbine circuit breaker
20 exhaust heat recovery boiler
21 main steam line
22 main steam valve
23 bypass line
24 bypass steam valve
25 gas duct
26 stack
27 exhaust gas damper
28 sub-gas duct
29 sub-stack
30 steam turbine
33 steam turbine rotor
34 steam condenser
35 water supply pump
39 water supply valve
50, 50a, 50b control device
51 general control section
52 fuel control section
53 main steam control section
54 bypass steam control section
55 gas turbine circuit breaker control section
56 steam turbine circuit breaker control section
57 exhaust gas control section
58 water supply control section

The invention claimed is:

1. An operation method of a multi-shaft combined cycle plant including a gas turbine, an exhaust heat recovery boiler that generates steam using an exhaust gas from the gas turbine, and a steam turbine that is driven by the steam generated by the exhaust heat recovery boiler, in which a gas turbine rotor of the gas turbine and a steam turbine rotor of the steam turbine are not mechanically connected to each other, the method comprising:

switching, according to a demanded load, between a low-load mode in which an output of the multi-shaft combined cycle plant is adjusted by adjustment of only an output of the gas turbine and a high-load mode in which the output of the multi-shaft combined cycle plant is adjustable by adjustment of the output of the gas turbine and adjustment of an output of the steam turbine; and supplying steam at a standby flow rate at which the steam turbine is capable of maintaining a predetermined initial load to the steam turbine, and applying the initial load to the steam turbine even in the low-load mode, wherein, when the demanded load becomes low in the high-load mode and the high-load mode is switched to the low-load mode, the steam at the standby flow rate is supplied to the steam turbine, wherein a load change time point which is a time point at which the demanded load after the switching to the low-load mode becomes a demanded load which is a high load that is not to be handled by adjustment of only the output of the gas turbine is recognized in advance, the steam at the standby flow rate is supplied to the steam turbine from the switching to the low-load mode to a steam supply stop time point which is a time point prior to the load change time point, the supply of the steam to the steam turbine is stopped from the steam supply stop time point to the load change time point, and the multi-shaft combined cycle plant transitions to the high-load mode from the load change time point, and wherein the steam supply stop time point is a time point at which an internal temperature of the steam turbine is equal to or higher than a predetermined temperature when the load change time point is reached.

2. The operation method of a multi-shaft combined cycle plant according to claim 1, wherein if a condition for supplying the steam from the exhaust heat recovery boiler to the steam turbine is satisfied after the gas turbine operation starts, the steam at the standby flow rate is supplied to the steam turbine regardless of the level of the demanded load.

3. The operation method of a multi-shaft combined cycle plant according to claim 1, wherein the multi-shaft combined cycle plant comprises a steam condenser that returns steam from the steam turbine to water, a bypass steam valve that adjusts a flow rate of steam flowing to the steam condenser from the exhaust heat recovery boiler without passing through the steam turbine, and a main steam valve that adjusts a flow rate of steam supplied to the steam turbine from the exhaust heat recovery boiler, and wherein when supplying the steam at the standby flow rate to the steam turbine, in a state where the bypass steam valve and the main steam valve are opened, an opening degree of at least one of the bypass steam valve and the main steam valve is controlled so that the steam at the standby flow rate is supplied to the steam turbine.

4. The operation method of a multi-shaft combined cycle plant according to claim 1, wherein the multi-shaft combined cycle plant comprises an exhaust gas damper that adjusts a flow rate of the exhaust gas sent from the gas turbine to the exhaust heat recovery boiler, and wherein when supplying the steam at the standby flow rate to the steam turbine, an opening degree of the exhaust gas damper is controlled so that the steam at the standby flow rate is supplied to the steam turbine.

5. A multi-shaft combined cycle plant comprising:
a gas turbine;
an exhaust heat recovery boiler that generates steam using an exhaust gas from the gas turbine;
a steam turbine that is driven by the steam generated by the exhaust heat recovery boiler, and includes a steam turbine rotor that is not mechanically connected to a gas turbine rotor of the gas turbine;
a control device that controls adjustment of an output of the gas turbine and an output of the steam turbine; and
a steam supply adjuster that adjusts a flow rate of steam supplied to the steam turbine from the exhaust heat recovery boiler, wherein the control device is configured to switch, according to a demanded load, between a low-load mode in which an output of the multi-shaft combined cycle plant is adjusted by adjustment of only the output of the gas turbine and a high-load mode in which the output of the multi-shaft combined cycle plant is adjustable by adjustment of the output of the gas turbine and the output of the steam turbine, wherein the control device is configured to control the steam supply adjuster so that, even in the low-load mode, steam at a standby flow rate at which the steam turbine is capable of maintaining a predetermined initial load is supplied to the steam turbine, and applies the initial load to the steam turbine, wherein when the demanded load becomes low in the high-load mode and the high-load mode is switched to the low-load mode, the control device is configured to control the steam supply adjuster so that the steam at the standby flow rate is supplied to the steam turbine, wherein the control device is configured to recognize in advance a load change time point which is a time point at which the demanded load after the switching to the low-load mode becomes a high-load demanded load that is not to be handled by adjustment of only the output of the gas turbine, wherein the control device is configured to control the steam supply adjuster so that the steam at the standby flow rate is supplied to the steam turbine from the switching to the low-load mode to a steam supply stop time point which is a time point prior to the load change time point, and to stop the supply of the steam to the steam turbine from the steam supply stop time point to the load change time point, and to control the multi-shaft combined cycle plant to transition to the high-load mode from the load change time point, and wherein the steam supply stop time point is a time point at which an internal temperature of the steam turbine is equal to or higher than a predetermined temperature when the load change time point is reached.

6. The multi-shaft combined cycle plant according to claim 5, further comprising:

a steam condenser that returns steam from the steam turbine to water;

a bypass steam valve that adjusts a flow rate of steam supplied to the steam condenser from the exhaust heat recovery boiler without passing through the steam turbine; and a main steam valve that adjusts a flow rate of steam supplied to the steam turbine from the exhaust heat recovery boiler, wherein the steam supply adjuster includes the bypass steam valve and the main steam valve, and wherein when supplying the steam at the standby flow rate to the steam turbine, in a state where the bypass steam valve and the main steam valve are opened, the control device is configured to control an opening degree of at least one of the bypass steam valve and the main steam valve so that the steam at the standby flow rate is supplied to the steam turbine.

7. The multi-shaft combined cycle plant according to claim 5, further comprising:

an exhaust gas damper that adjusts a flow rate of the exhaust gas supplied from the gas turbine to the exhaust heat recovery boiler, wherein the steam supply adjuster includes the exhaust gas damper, and wherein, when supplying the steam at the standby flow rate to the steam turbine, the control device is configured to control an opening degree of the exhaust gas damper so that the steam at the standby flow rate is supplied to the steam turbine.

8. A control device of a multi-shaft combined cycle plant comprising a gas turbine, an exhaust heat recovery boiler that generates steam using an exhaust gas from the gas turbine, a steam turbine that is driven by the steam generated by the exhaust heat recovery boiler, and a steam supply adjuster that adjusts a flow rate of steam supplied to the steam turbine from the exhaust heat recovery boiler, in which a gas turbine rotor of the gas turbine and a steam turbine rotor of the steam turbine are not mechanically connected to each other, wherein the control device is configured to:

switch, according to a demanded load, between a low-load mode in which an output of the multi-shaft combined cycle plant is adjusted by adjustment of only an output of the gas turbine and a high-load mode in which the output of the multi-shaft combined cycle plant is adjustable by adjustment of the output of the gas turbine and an output of the steam turbine, and control the steam supply adjuster so that, even in the low-load mode, steam at a standby flow rate at which the steam turbine is capable of maintaining a predetermined initial load is supplied to the steam turbine, and applies the initial load to the steam turbine, wherein when the demanded load becomes low in the high-load mode and the high-load mode is switched to the low-load mode, the control device is configured to control the steam supply adjuster so that the steam at the standby flow rate is supplied to the steam turbine, wherein the control device is configured to recognize in advance a load change time point which is a time point at which the demanded load after the switching to the low-load mode becomes a demanded load which is a high load that is not to be handled by adjustment of only the output of the gas turbine, wherein the control device is configured to control the steam supply adjuster so that the steam at the standby flow rate is supplied to the steam turbine from the switching to the low-load mode to a steam supply stop time point which is a time point prior to the load change time point, and to stop the supply of the steam to the steam turbine from the steam supply stop time point to the load change time point, and to control the multi-shaft combined cycle plant to transition to the high-load mode from the load change time point, and wherein the steam supply stop time point is a time point at which an internal temperature of the steam turbine is equal to or higher than a predetermined temperature when the load change time point is reached.

* * * * *